3,179,630
PROCESS FOR PREPARING POLYIMIDES BY TREATING POLYAMIDE-ACIDS WITH LOWER FATTY MONOCARBOXYLIC ACID ANHYDRIDES

Andrew Laszlo Endrey, Parma, Ohio, assignor to E. I. du Pont de Nemours and Company, Wilmington, Del., a corporation of Delaware
No Drawing. Filed Jan. 26, 1962, Ser. No. 169,106
14 Claims. (Cl. 260—78)

This invention relates to novel polymeric materials and has as its primary object a novel method for the preparation of polyimides. Other objects will appear hereinafter.

This application is a continuation-in-part of my copending application Serial No. 803,348 filed April 1, 1959, now abandoned.

The resulting polyimides are characterized by a recurring unit having the following structural formula:

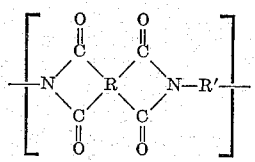

wherein R is a tetravalent radical containing at least six carbon atoms in a ring, said ring characterized by benzenoid unsaturation, the four carbonyl groups being attached to separate carbon atoms and each pair of carbonyl groups being attached to adjacent carbon atoms in a 6-membered benzenoid ring of the R radical; and wherein R' is a divalent organic radical containing at least two carbon atoms.

The polyimides, prepared by the process of the present invention, display outstanding physical and chemical properties which make them very useful as shaped structures.

The polyimides are prepared by reacting at least one organic diamine having the structural formula:

$$H_2N-R'-NH_2$$

wherein R' is a divalent radical containing at least 2 carbon atoms, the two amino groups of said diamine each attached to separate carbon atoms of said divalent radical; with at least one tetracarboxylic acid dianhydride having the structural formula:

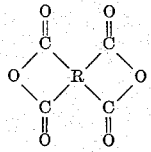

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature below 175° C. sufficient to form "$n$" moles of a polyamide-acid, each mole containing "$m$" amide-acid linkages and then converting the polyamide-acid to the polyimide by treating the polyamide-acid composition with "$n$" times "$m$" moles of a lower fatty monobasic acid anhydride, preferably acetic anhydride. Although the stoichiometric equivalent, based on the polyamide-acid, of the anhydride alone is operable in the present invention, it is preferred to have some of a tertiary amine, preferably pyridine, present as well. The ratio of the tertiary amine to anhydride may vary from zero to almost infinite mixtures with a 1:1 ratio being the most commonly used with tertiary amines having the activity of pyridine. The amine functions as a catalyst for the action of the cyclizing agent, the anhydride.

Besides acetic anhydride, other operable lower fatty acid anhydrides include propionic, butyric, valeric, mixed anhydrides of these with one another and with anhydrides of aromatic monocarboxylic acids, e.g. benzoic acid, naphthoic acid, etc. and with anhydrides of carbonic and formic acids, as well as aliphatic ketenes (ketene and dimethyl ketene). The preferred anhydrides are acetic anhydride and ketene. Ketenes are regarded as anhydrides of carboxylic acids, (ref. Bernthsen-Sudborough, textbook of Organic Chemistry, Van Nostrand, 1935, page 861, and Hackh's Chemical Dictionary, Blakiston, 1953, page 468) derived from drastic dehydration of the acids.

Tertiary amines having approximately the same activity as the preferred pyridine may be used in the process. These include 3,4-lutidine, 3,5-lutidine, 4-methyl pyridine, 3-methyl pyridine, 4-isopropyl pyridine, N-dimethyl benzyl amine, isoquinoline, 4-benzyl pyridine, and N-dimethyldodecyl amine. As mentioned previously, these amines are generally used in approximately equimolar amount with that of the anhydride converting agent. Trimethyl amine and triethylene diamine are much more reactive, and therefore are generally used in smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts.

Because it is easier to form a shaped structure of the polyamide-acid composition rather than the polyimide, it is preferred to form a shaped structure of the polyamide-acid composition prior to converting the polyamide-acid to the polyimide. Hence, it is only necessary to provide a composition containing enough polyamide-acid so that it can be shaped into useful objects prior to conversion of polyamide-acid to polyimide. For this purpose, it has been found that a composition containing a polymeric component made up of at least 50% of the polyamide-acid will suffice for most combinations of diamine/dianhydride reaction products. However, for polyamide-acids prepared from some combinations of diamine and dianhydride, the polymeric components of shapeable compositions may contain less than, or may have to contain more than the preferred minimum of 50%.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc. and thus produce shaped articles such as films and filaments of optimum toughness, it has been found that the temperature throughout the reaction should be maintained below 60° C., preferably below 50° C.

The details of a preferred process involve premixing equimolar amounts of the diamine and the dianhydride as dry solids and then adding the mixture, in small proportions and with agitation, to the organic solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature at the desired level. However, the order of addition may be varied. After premixing the diamine and the dianhydride, the solvent may be added to the mixture with agitation. It is also possible to dissolve the diamine in the solvent while agitating, preheat the solution and then add the dianhydride at a sufficiently slow rate to control the reaction temperature. Ordinarily, in this latter process the last portion of the dianhydride is added with part of the organic solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained. Still another process involves dissolving the diamine in one portion of a solvent and the dianhydride in another portion of the same or another solvent and then mixing the two solutions.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. However, the scope of the process encompasses the use of up to 5% excess of either the diamine or the dianhydride. More than 5% excess of either reactant results in an undesirably low molecular weight polyamide-acid. For some purposes, it is desirable to use 1-3% excess of either reactant, preferably the dianhydride. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3-5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05-40% of the polymeric component. The viscous solution of the polymeric composition containing at least 50% polyamide-acid in the polymeric component dissolved in the solvent may be used as such for forming shaped structures.

The shaped articles composed of at least 50% polyamide-acid are then converted by treatment with the anhydride/tertiary amine mixtures to the respective polyamide shaped articles. It should be understood that the conversion process also applies to compositions containing salt derivatives of the polyamide-acids, e.g., the triethyl ammonium salt of the polyamide-acids, instead of the polyamide-acids themselves.

It should also be understood that instead of shaping the polyamide-acid composition into the usual articles, the polyamide-acid composition in the solvent may be used as a liquid coating composition. Such coating compositions may be pigmented with such compounds as titanium dioxide in amounts of 5-200% by weight. These coating compositions may be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyvinyl acetals such as polyvinyl butyral, polyurethanes, all polymeric materials in the form of sheets, fibers, foams, woven and non-woven fabrics, screening, etc.; leather sheets; etc. The polyamide-acid coatings are then converted to polyimide coatings by the process of this invention.

The presence of polyimides is evidenced by their insolubility in cold NaOH solution as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates. In some cases, one can also detect isoimide linkages, i.e.

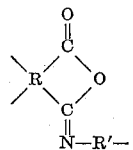

The starting materials for forming the products of the present invention are organic diamines and tetracarboxylic acid dianhydrides. The organic diamines are characterized by the formula: $H_2N-R'-NH_2$, wherein $R'$, the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred R' groups in the diamines are those containing at least 6 carbon atoms characterized by benzenoid unsaturation. Such R' groups include

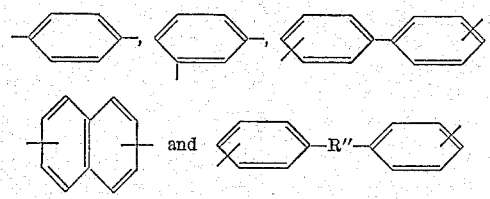

wherein R'' is selected from the group consisting of carbon in an alkylene chain having 1-3 carbon atoms, oxygen, silicon in

and

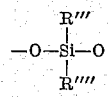

phosphorus in

and

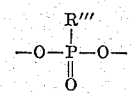

and sulphur alone or in —SO$_2$— where R''' and R'''' are alkyl or aryl. Among the diamines which are suitable for use in the present invention are:

meta-phenylene diamine;
paraphenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino-naphthalene;
3,3'-dimethyl-4,4'-diamino-biphenyl;
3,3'-dimethoxy benzidine;
2,4-bis(beta-amino-t-butyl)toluene;
bis-(para-beta-amino-t-butyl-phenyl) ether;
para-bis(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
H$_2$N(CH$_2$)$_3$O(CH$_2$)$_2$O(CH$_2$)$_3$NH$_2$;
H$_2$N(CH$_2$)$_3$S(CH$_2$)$_3$NH$_2$;
H$_2$N(CH$_2$)$_3$N(CH$_3$)(CH$_2$)$_3$NH$_2$;
and mixtures thereof.

The tetracarboxylic acid dianhydrides are characterized by the following formula:

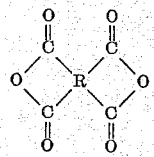

wherein R is a tetravalent organic radical selected from the group consisting of aromatic, aliphatic, cycloaliphatic, heterocyclic, combination of aromatic and aliphatic, and substituted groups thereof. However, the preferred dianhydrides are those in which the R groups have at least 6 carbon atoms characterized by benzenoid unsaturation, i.e. alternate double bonds in a ring structure, wherein the 4 carbonyl groups of the dianhydride are each attached to separate carbon atoms and wherein the carbon atoms of each pair of carbonyl groups is directly attached to adjacent carbon atoms in the R group to provide a 5-membered ring as follows:

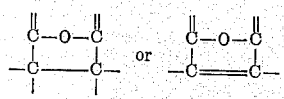

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl)sulfone dianhydride; 3,4,-9,10-perylene tetracarboxylic dianhydride; bis(3,4-dicarboxyphenyl) ether dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(3,4-dicarboxyphenyl)sulfone dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. The may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl-urea, pyridine, dimethylsulfone, hexamethylphosphoramide, tetramethylene sulfone, formamide, N-methylformamide, butyrolactone. The solvents can be used alone, in combinations of solvents, or in combination with poor solvents such as benzene, benzonitrile, dioxane, xylene, toluene and cyclohexane.

The conversion step is accomplished by treatment with sufficient lower fatty acid anhydride to convert the polyamide-acid to the polyimide. If the polyamide-acid has been partially converted to polyimide prior to this step, then only enough anhydride to convert the unconverted polyamide-acid need be used. The minimum amount to provide complete conversion is the stoichiometric equivalent of the polyamide-acid present, i.e. "$n$"×"$m$" moles of anhydride to convert "$n$" moles of polyamide-acid, each mole containing "$m$" amide-acid linkages. Ordinarily, a large excess of anhydride is used in the presence of a diluent.

The most useful diluent in the conversion step is a tertiary amine, e.g. the previously mentioned pyridine. However, other diluents may also be used with or without the tertiary amine. The list includes benzene, cyclohexane, chloroform, carbon tetrachloride, acetonitrile, benzonitrile, quinoline, dimethylaniline, dimethylcyanamide, tetramethylene sulfone and ethyl acetate. Primarily, the diluents promote better diffusion of the anhydride through the polyamide-acid structure.

In one possible conversion process, a film layer of the viscous, unconverted polyamide-acid solution may be passed into a chemical conversion bath. As the conversion reagents diffuse into the layer of polyamide-acid, the polyimide rapidly gels out of solution as a clear film still swollen with considerable solvent. Solvent removal and completion of conversion of this gel film may now be effected by heating.

In another procedure, a layer of polyamide-acid solution (generally 5–20% solids in dimethylformamide or dimethylacetamide) may be cast on a glass plate or a belt of an inert material, e.g. polyethylene terephthalate film, and passed into a bath consisting of equal volumes of acetic anhydride and pyridine at room temperature or above. The liquid film of polyamide-acid rapidly gels and becomes insolubilized to a clear, tough polyimide film which separates from the glass or polyethylene terephthalate film support. It may then be leached in such liquids as cyclohexanone, dioxane, or acetic anhydride/pyridine/benzene (10/10/80). This gel film is usually swollen with large amounts of solvent. Removal of solvent and completion of conversion may also be effected by gradually heating the gel films under restraint to temperatures of 300° C. or above.

Since conversion usually occurs very slowly if the polyamide-acid solution is contacted with only one of the conversion reagents, the process may be varied so that one of the liquids in the conversion bath (either the acetic anhydride or the pyridine) can be present in the casting dope of polyamide-acid. This solution can then be cast into a solution of the other reagent at room temperature or above.

The above processes offer the advantages of permitting the rapid preparation of a polyimide film directly from solutions of the polyamide-acids without first drying a polyamide-acid film. These processes also avoid degradation which may occur if the polyamide-acid films had to be dried prior to conversion. Lastly, these processes permit the preparation of thick (10–12 mil) polyimide films.

Another possible conversion process involves the partial pre-conversion of polyamide-acid solution and its formation into poly(amide-acid/imide) film while still plastic and solvent-swollen. The conversion may then be completed in film form either chemically, thermally or by a combination of these methods.

In another procedure, a quantity of acetic anhydride, at least stoichiometric with the water to be removed for conversion to polyimide, is added to a polyamide-acid solution in dimethylacetamide. Controlled dehydration necessitates using tertiary amine catalyst, e.g. pyridine. The rate conversion is regulated by the temperature and the quantity of pyridine added. One then adds 20–100% of the quantity of pyridine equivalent to the polyamide-acid. The solution consisting of poly(amide-acid/imide), acetic anhydride, acetic acid and pyridine (i.e. pyridinium acetate) in dimethylacetamide undergoes essentially no change of biscosity for a period of 10 to 30 minutes at room temperature. Hence, it can be formed into a shaped article, e.g. extruded in the form of a film through a conventional extruder. After being shaped, the material can be completely insolubilized rapidly to intractable polyimide film by raising the temperature to about 300° C. for 10–100 seconds. This process is not dependent on the diffusion of the reagent through the shaped polyamide-acid article. Furthermore, chemical changes which tend to cause shrinkage are largely accomplished before the article is formed.

In still another possible process, the solution of the polyamide-acid is jet mixed with a suitable conversion liquid and is, thereafter, formed into a shaped article such as a film by conventional means. The time elapsed from contact of polyamide-acid with conversion liquid to the formation of a self-supporting film consisting mainly of polyimide can be drastically reduced to less than 30 seconds at room temperature by this process.

The invention will be more clearly understood by referring to the examples which follow. These examples, which illustrate specific embodiments of the present invention, should not be construed to limit the invention in any way.

For convenience, abbreviations will be used wherever possible. Thus, MPD represents meta-phenylenediamine; PPD, para-phenylenediamine; DDP, 4,4'-diamino-diphenyl propane; DDM, 4,4'-diamino-diphenyl methane; PP, benzidine; POP, 4,4'-diamino-diphenyl ether; PSP, 4,4'-diamino-diphenyl sulfide; $PSO_2P$, 4,4'-diamino-diphenyl sulfone; PMDA, pyromellitic dianhydride; DMF, N,N-dimethylformamide; DMA, N,N-dimethylacetamide; NMP, N-methyl-2-pyrollidone; P, pyridine; IQ, isoquinoline; AA, acetic anhydride; PA, propionic anhydride; K, ketene; AFA, acetic formic anhydride; HMD, hexamethylenediamine; and DMHMD, 4,4'-dimethylheptamethylenediamine.

The examples are summarized in Table I. The description of tests performed are presented immediately after the table. The details of the examples, wherein some of the compositions are shaped into useful structures such as films and filaments, follow the test descriptions.

The preparations of some of the important ingredients used in the examples are given below:

The pyromellitic dianhydride used was obtained as white crystals by sublimation of the commercial product through silica gel at 220–240° C. and 0.25–1 mm. mercury pressure.

N,N-dimethylformamide and N,N-dimethylacetamide were prepared by fractional distillation from phosphorous pentoxide; the fraction distilling at 47.5° C. and 17 mm. pressure being N,N-dimethylformamide and the fraction distilling at 73° C. and 30 mm. pressure being N,N-dimethylacetamide.

TABLE I.—SUMMARY OF EXAMPLES

| Example | Polyamide-acid formation | | Conversion step chemicals used |
| --- | --- | --- | --- |
| | Reactants | Solvent | |
| 1 | MPD | PMDA | DMA | AA/P. |
| 2 | PP | PMDA | DMF | AA/P/benzene. |
| 3[1] | DDP | PMDA | DMF | AA/P. |
| 4[1] | {MPD / PPD} | PMDA | DMF | AA/P. |
| 5[1] | MPD | PMDA | DMA | AA/P/cyclohexane. |
| 6[1] | MPD | PMDA | DMA | AA/P/acetonitrile. |
| 7[1] | MPD | PMDA | DMA | AA/P/chloroform. |
| 8[1] | MPD | PMDA | DMA | AA/P/benzene. |
| 9[1] | MPD | PMDA | DMA | AA/P. |
| 10[1] | MPD | PMDA | DMA | AA/P/carbon tetrachloride. |
| 11 | {MPD / PP} | PMDA | DMF | AA/P/benzene. |
| 12 | {MPD / DDM} | PMDA | DMF | AA/tetramethylene sulfone. |
| 13 | PSP | PMDA | DMF | AA/P/cyclohexane. |
| 14 | PSO₂P | PMDA | DMF | AA/P/cyclohexane. |
| 15 | MPD | PMDA | DMA/P | AA. |
| 16 | DDM | PMDA | DMA/P | AA. |
| 17 | DDM | PMDA | DMA/AA | AA/P/ethyl acetate. |
| 18 | POP | PMDA | DMA/P | AA. |
| 19 | PSP | PMDA | P | AA. |
| 20 | PSP | PMDA | DMA/P | AA. |
| 21 | MPD | PMDA | DMF | AA/P. |
| 22 | PPD | PMDA | DMA | AA/P. |
| 23 | PP | PMDA | DMF | AA/P. |
| 24 | {DDP / PP} | PMDA | DMF/P | AA/P. |
| 25 | PSO₂P | PMDA | DMF | AA/P. |
| 26 | PSP | PMDA | DMF | AA/P. |
| 27 | HMD | PMDA | DMA | AA/P/benzene. |
| 28 | DMHMD | PMDA | DMA | AA/P/benzene. |
| 29 | POP | PMDA | DMA | AA/P/benzene. |
| 30 | POP | PMDA | DMA | AA/P/benzene. |
| 31 | POP | PMDA | DMA | AA/P/benzene. |
| 32 | POP | PMDA | DMA/P | AA/P. |
| 33 | POP | PMDA | DMA/P | AA/P. |
| 34 | POP | PMDA | DMA | AA/P. |
| 35 | POP | PMDA | DMA/NMP | AA/P. |
| 36 | POP | PMDA | DMA/NMP | AA/P. |
| 37 | POP | PMDA | DMA/benzene | AA/P. |
| 38 | POP | PMDA | DMA | AA/benzene. |
| 39 | POP | PMDA | DMA | AA/IQ. |
| 40–48 | POP | PMDA | DMA | AA/various amines. |
| 49–51 | POP | PMDA | DMA | Various anhydrides/IQ. |
| 52 | POP | PMDA | DMA | PA/P. |
| 53–54 | POP | PMDA | DMA | K. |
| 55 | POP | PMDA | DMA | AFA. |

[1] In these examples, the acid groups in the polyamide-acid were converted to the triethylammonium salt.

*Test descriptions*

*Tensile strength, elongation and tensile modulus.*—These measurements are determined at 23° C. and 50% relative humidity. They are determined by elongating the film sample[1] or filament at a rate of 100% per minute until the sample breaks. The force applied at the break in pounds/square inch (p.s.i.) is the tensile strength for films; in grams/denier (g.p.d.) is tenacity for filaments. The elongation is the percent increase in the length of the sample at breakage. Initial tensile modulus in p.s.i. or g.p.d. is directly related to film or filament stiffness. It is obtained from the slope of the stress-strain curve at the elongation of 1%; both tensile strength and initial tensile modulus are based upon the initial cross-sectional area of the sample.

*Degree of toughness* is determined by subjecting a film 1 to 7 mils thick to a series of creasing actions by folding the film through 180° and creasing, followed by folding through 360° and creasing, to complete one cycle. The number of creasing cycles which the film withstands before breaking at the crease line is referred to herein as the "degree of toughness." If a film cannot be creased without breaking, it has a "degree of toughness" of 0, and if the film breaks on the second cycle, its "degree of toughness" is 1, and so on. The "degree of toughness" for films of the present invention must be at least 3.

*Retention of degree of toughness.*—This test is used for determining the effect of heat on the retention of toughness. It involves heating the polymer at 360° C. for 20 minutes under nitrogen, and determining loss of toughness caused by such heating. The retention of the "degree of toughness" must also be at least 3.

EXAMPLE 1

Meta-phenylenediamine, 6.2 g., was dissolved in 50 ml. of dimethylacetamide. The solution was cooled (water jacket ca. 15° C.) and 12.5 g. of pyromellitic dianhydride was added portionwise with stirring. Twenty-five milliliters of dimethylacetamide was added to give a polyamide-acid solution containing 20.8% polymer, by weight. Films were cast with a doctor knife having a 10-mil opening and dried at 120–130° C. for 30 minutes. Inherent viscosity of the polymer solution as measured in a 0.5% solution of DMA was 0.91.

The film was soaked overnight in a mixture of 180 ml. of benzene, 120 ml. pyridine and 50 ml. of acetic anhydride. The film was dried at 160° C. in vacuum for 2 hours to give strong, tough, flexible film. Its infrared spectra indicated a polyimide film had been obtained.

EXAMPLE 2

Benzidine, 16.9 g., was dissolved in 100 ml. of dimethylformamide. Pyromellitic dianhydride, 20.0 g., was added portionwise with stirring and cooling (water jacket ca. 15° C.). A viscous solution was formed and was further diluted with 150 ml. of dimethylformamide to give a polyamide-acid solution containing 13.5% polymer, by weight. Inherent viscosity as measured in a 0.5% solution of dimethylformamide was 1.8. The polymer solution was cast with a doctor knife having a 15-mil opening into films and dried at 120° C. under draft for 20 minutes. The films were soaked in a mixture of 230 ml. benzene, 200 ml. pyridine and 100 ml. acetic anhydride for at least 20 hours. The films were then dried at 180°

[1] Samples were cut with a Thwing-Albert Cutter which cut samples ¼″ wide.

C. in a vacuum for 2 hours to give tough, flexible polyimide films.

EXAMPLE 3

4,4'-diamino-diphenyl propane, 10.35 g., and pyromellitic dianhydride, 10.0 g., were weighed into a beaker and mixed. The solid mixture was added to 75 ml. of dimethylformamide with stirring with cooling (water jacket ca. 11° C.). After the solids had dissolved, the solvent solution obtained had an inherent viscosity as measured in a 0.5% solution of DMA of 0.74. The polyamide-acid solution was diluted with 50 ml. of dimethylformamide and then 5.5 ml. of triethylamine was added.

A portion of the casting dope containing the triethylamine was poured into a mixture of acetic anhydride (50 ml.) and pyridine (120 ml.) in a Waring blender and stirred for 30 minutes. A yellow precipitate was obtained. The reaction appeared to be complete within 5 minutes. The precipitate was filtered, washed with benzene, and dried at 120° C. in a vacuum for 120 minutes. The infrared spectra of the powder showed it to be a polyimide powder.

EXAMPLE 4

Meta-phenylenediamine, 8.7 g., and 3.7 g. of paraphenylenediamine and 25.0 g. of pyromellitic dianhydride were weighed into a flask and mixed. The solid mixture was added portionwise into 100 ml. of dimethylformamide with stirring, while the solution was cooled (water jacket ca. 15° C.). The last portion was added with 50 ml. of dimethylformamide to give a polyamide-acid solution containing 20.6% polymer, by weight. Inherent viscosity as measured in a 0.5% solution of DMA was 1.5.

To a 110 g. portion of the polymer solution was added 9.5 ml. of triethylamine and 50 ml. of dimethylformamide. The polymer started to precipitate and then to this mixture 4.5 ml. of acetic anhydride and 7.5 ml. of pyridine and 10 ml. of acetic acid were added to give a yellow, viscous solution after some stirring. A portion of the polyamide-acid solution was cast with a doctor knife having a 10-mil opening and dried at 120–130° C. for 15 minutes. The films were then converted to the corresponding polyimide by soaking in a large excess of pyridine-acetic anhydride (3/2 by volume) mixture for 12 hours. The films were dried for one hour at 130° C., then for one hour at 250° C. in a vacuum. The films were then heat treated at 380 C. (in air) for 5 minutes to provide tough, flexible films.

EXAMPLES 5–8

Meta-phenylenediamine, 6.2 g., and pyromellitic dianhydride, 12.5 g., were weighed into a flask and mixed. The mixture was added portionwise into 50 ml. of dimethylacetamide with stirring and cooling (water jacket ca. 15° C.). The last portion was added with 10 ml. of dimethylacetamide and a viscous polyamide-acid solution was obtained. Eight milliliters of triethylamine was added with 15 ml. of dimethylacetamide to give a solution of the triethylamine salt of the polymer. Films were cast with a doctor knife having a 10-mil opening and dried at 120° C. for 15 minutes in a forced draft oven.

The films were soaked in a chemical bath, consisting of 30 ml. pyridine, 30 ml. of acetic anhydride, plus 450 ml. of solvent. The solvent in these cases was: Example 5, cyclohexane; Example 6, acetonitrile; Example 7 chloroform; and Example 8, benzene. The completeness of the conversion was checked by heating the film in a 400° C. oven. The films were extracted with dioxane, and dried at 110° C. for one hour. The conversion was complete in Examples 4 and 5 after 16 hours, and in Examples 6 and 7 the conversion was complete after 40 hours. In all cases, the polyimide films obtained were tough and flexible.

EXAMPLES 9–10

The polymerization was conducted as in the manner of Examples 4–7 with the exception that 120 ml. of dimethylacetamide was added with the 8.0 ml. of triethylamine to give a solution of the triethylamine salt of the polyamide-acid. Films were cast with a doctor knife having a 15-mil opening and dried at 120° C. for 15 minutes in a forced draft oven.

The films were soaked in chemical baths consisting of 220 ml. of pyridine plus 280 ml. of acetic anhydride in Example 9 and 22 ml. of pyridine plus 28 ml. of acetic anhydride plus 450 ml. of carbon tetrachloride in Example 10. In both cases, acceptable polyimide films (tough, flexible) were obtained. The conversion in Example 9 was complete after 24 hours. In Example 10, the conversion was complete after 4 days. The films were extracted with dioxane and dried at 120° C.

EXAMPLE 11

Meta-phenylenediamine, 6.2 g., and benzidine, 10.56 g., plus 25.1 g. of pyromellitic dianhydride were weighed into a flask. The solid mixture was added portionwise into 100 ml. of DMF, with stirring and cooling (water jacket ca. 15° C.). During the addition, the polyamide-acid solution became very viscous and 400 ml. of dimethylformamide was added. Films were cast with a doctor knife having a 20-mil opening and dried at 120–130° C. for 15 minutes. The films were converted to the corresponding polyimide by soaking in a 90/6/6 (by volume) cyclohexane/pyridine/acetic anhydride mixture for 24 hours. Films were extracted with dioxane for one hour and dried at 130° C. for 2 hours. The polyimide films were tough and flexible.

EXAMPLE 12

Meta-phenylenediamine, 6.2 g., and 11.4 g. of 4,4'-diamino-diphenyl methane and 25.0 g. pyromellitic dianhydride were weighed, mixed and added portionwise into 100 ml. of dimethylformamide with stirring and cooling (water jacket at ca. 15° C.). Gradually, the reaction mixture was diluted to give a final polyamide-acid solution containing 42.6 g. of polymer (3% by weight), 190 ml. dimethylformamide and 126 ml. of pyridine. Films were cast with doctor knives having 15- and 20-mil openings and dried at 120° C. for 6–10 minutes. Inherent viscosity was 2.03 as measured in a 0.5% solution of DMF. The films were then dipped into a 4/1 tetramethylene sulfone/acetic anhydride mixture for at least one hour. The films were extracted with dioxide and then dried at 120° C.

EXAMPLE 13

4,4'-diamino-diphenyl sulfide, 10.0 g., was dissolved in 75 ml. of dimethylformamide. Pyromellitic dianhydride, 10.15 g., was added portionwise with stirring and cooling over a period of 15 minutes to give a viscous solution of the polyamide-acid thereof. The last part of the dianhydride was added with 25 ml. of dimethylformamide. Films were cast with a doctor knife having a 15-mil opening and dried under nitrogen in a forced draft oven at 120° C. for 10–15 minutes. The inherent viscosity of the polyamide-acid solution was 1.2, as measured in a 0.5% solution of DMF. The films were soaked in a 13/1/1 cyclohexane/acetic anhydride/pyridine mixture. After three days the solution was poured off, the films were rinsed with dioxane and steeped in dioxane for one hour. The films were then dried at 120° C. for 15 minutes and then heated at 300° C. for 15 minutes. The physical properties of the films at 23° C. were:

Initial modulus _____ p.s.i.__ 290,000
Elongation _____ percent__ 7.8
Tensile strength _____ p.s.i.__ 9,500

The film was then heat treated at 380° C. for one minute with the resulting physical properties:

Initial modulus _____ p.s.i.__ 260,000
Elongation _____ percent__ 10.8
Tensile strength _____ p.s.i.__ 10,400

EXAMPLE 14

Pyromellitic dianhydride, 10.0 g., and 11.39 g. of 4,4'-diamino-diphenyl sulfone were weighed, mixed and added portionwise into 16 ml. of DMF with stirring and cooling (water jacket at ca. 15° C.) over a period of 90 minutes. The last portion of the reactants was added with 20 ml. of DMF. The reaction was allowed to proceed for 40 hours to give a polyamide-acid solution containing 22% polymer by weight. The inherent viscosity was 0.64 as measured in a 0.5% solution of DMF. The films were cast with a doctor knife having a 10-mil opening and dried at 120° C. in a forced draft oven for 10 minutes. The films were steeped in 13/1/1 cyclohexane/pyridine/acetic anhydride for 3 days, then steeped in dioxane and dried at 120° C. for 15 minutes to form satisfactory self-supporting films.

EXAMPLE 15

A polyamide-acid solution was prepared by mixing and stirring the following, with exclusion of moisture, for 18 hours at room temperature:

|  | Parts |
|---|---|
| Meta-phenylenediamine | 5.407 |
| Pyromellitic dianhydride | 10.906 |
| Dimethylacetamide | 47.15 |
| Pyridine | 32.78 |

A portion of the resultant viscous solution was removed, diluted with dimethylacetamide to 0.5%, and the inherent viscosity determined at 30° C. The value was found to be 1.94. The solution was spun through a spinneret having 100 holes of 0.003 inch diameter each into a bath of acetic anhydride at room temperature. Bath travel was 3 feet. Filaments were removed from the bath around a roll at 32 feet per minute and then to another roll at 54 feet per minute to give a 1.7 draw ratio. The filaments were then extracted in water for one hour and dried. Physical properties of the resulting filaments were tenacity, 1.3 grams/denier; elongation, 45%; initial tensile modulus, 30 grams/denier. When the windup on the second roll was 70 feet per minute (draw ratio of 2.2×) the filaments had tenacity, 2.2 grams/denier; elongation, 22%; initial tensile modulus, 43 grams/denier.

EXAMPLE 16

By the procedure of Example 15, a polyamide-acid solution was prepared from the following:

|  | Parts |
|---|---|
| 4,4'-diamino-diphenyl methane | 9.913 |
| Pyromellitic dianhydride | 10.906 |
| Dimethylacetamide | 47.08 |
| Pyridine | 49.15 |

The inherent viscosity was 1.4. Spinning was from a spinneret having 27 protruded holes of 0.005 inch diameter each. Filaments were obtained in the manner described in Example 15 using roll speeds, draw ratios and having the physical properties shown in Table II.

TABLE II

|  | 1st roll (feet/minute) | 2nd roll (feet/minute) | Draw ratio (times) | $T/E/M_i$ |
|---|---|---|---|---|
| A | 8.5 | 9.0 | 1.05 | 0.95/71/22 |
| B | 8.5 | 16.5 | 1.94 | 1.5/27/29 |
| C | 9.5 | 15.5 | 1.63 | 1.3/37/27 |
| D | 20.0 | 31.0 | 1.55 | 1.4/29/31 |
| E | 29.5 | 35.0 | 1.19 | 1.5/29/32 | wherein T is tenacity in grams/denier, E is percent elongation and $M_i$ is initial tensile modulus in grams/denier.

Heating the filaments of B at 300° C. for 5 minutes improved the properties to 3.0/28/50. Further stretching the filaments of C an aditional 2.2 times improved the properties to 3.4/26/65.

EXAMPLE 17

A polymer similar to that in Example 16 was prepared from the following by mixing at 0–25° C. for 6 hours:

|  | Parts |
|---|---|
| 4,4'-diamino-diphenyl methane | 15.84 |
| Pyromellitic dianhydride | 17.44 |
| Dimethylacetamide | 100 |

The viscous solution was diluted with 18 parts dimethylacetamide and 20 parts acetic anhydride. The solution was spun through a spinneret having 100 holes of 0.003 inch diameter each into a bath of 80% ethyl acetate, 10% pyridine, and 10% acetic anhydride. Bath travel was 6 feet. The filaments were removed at 21 feet per minute and stretched 2.05 times by passing around a second roll at 43 feet per minute. The filaments were air-dried, heated at 150° C. for 30 minutes, 300° C. for 20 minutes, and finally at 400° C. for 4 minutes. The filament properties were 1.9/22/25 ($T/E/M_i$) and the individual filament denier was 3.8.

EXAMPLE 18

A polymer solution was prepared by the method of Example 17 from the following:

|  | Parts |
|---|---|
| 4,4'-diamino-diphenyl ether | 20.00 |
| Pyromellitic dianhydride | 21.80 |
| Dimethylacetamide | 100 |
| Pyridine | 68 |

Inherent viscosity was 1.13. Filaments were prepared by spinning the solution through a spinneret having 100 holes of 0.003 inch diameter each into a bath of acetic anhydride using a bath travel of 6 feet. The filaments were conducted around a first roll at 6.7 feet per minute and then to a second roll at 23.5 feet per minute for a draw ratio of 3.5. After air-drying, the filaments of 3.6 denier each had the following properties: 2.2/11.5/63 ($T/E/M_i$). The filaments after heating at 600° C. for 2 minutes under nitrogen had properties of 4.5/8.4/65 ($T/E/M_i$).

EXAMPLE 19

A polyamide-acid was prepared by the method of Example 17 from the following:

|  | Parts |
|---|---|
| 4,4'-diamino-diphenyl sulfide | 2.16 |
| Pyromellitic dianhydride | 2.18 |
| Pyridine | 20 |

Inherent viscosity was 1.37. The solution was diluted with 6.7 parts pyridine and spun as in the previous examples into acetic anhydride to give satisfactory filaments.

EXAMPLE 20

A polymer similar to that in Example 19 was prepared by the procedure described in Example 15 from the following:

|  | Parts |
|---|---|
| 4,4'-diamino-diphenyl sulfide | 10.816 |
| Pyromellitic dianhydride | 10.906 |
| Dimethylacetamide | 47.15 |
| Pyridine | 39.76 |

Inherent viscosity was 1.20. The resulting polyamide-acid solution was spun into acetic anhydride as in Example 15. Filaments were removed at 7.5 feet per minute and then wound up at 15 feet per minute for a draw ratio of 2. Filament properties were 1.67/35/29 ($T/E/M_i$). With a draw ratio of 2.5 during spinning and a further draw of 2.3 times, properties were 2.2/39/29 ($T/E/M_i$).

EXAMPLE 21

Meta-phenylenediamine, 12.4 g. (0.115 mole) was dissolved in 75 ml. of dimethylformamide. 25.00 g. (0.115 mole) of pyromellitic dianhydride was added portionwise with agitation while the solution was externally cooled with circulating water at approximately 15° C. The last portion of dianhydride was added in 10 ml. of dimethylformamide. A viscous dope formed and was further diluted with 60 ml. of dimethylformamide and then filtered through a pressure filter.

Films were cast on glass plates and dried in vacuo at 80° C. for 30 minutes. After removal from the plates, the films were steeped in a 15/1/1 cyclohexane/pyridine/acetic anhydride mixture for 48 hours, then extracted in dioxane for one hour and then dried at 120° C. for one hour. The plate with the film was then heated to 300° C. in a hot vacuum oven for 15 minutes to improve the properties of the polyimide. The polyimide films displayed the following properties:

Tensile modulus _____ 320,000 p.s.i.
Elongation _____ 12%.
Tensile strength _____ 9,400 p.s.i.
Retention of degree of toughness _____ Greater than 3.

EXAMPLE 22

A polyamide-acid solution was prepared substantially as described for Example 21 using 6.2 grams of paraphenylenediamine, 12.5 grams of pyromellitic dianhydride and 120 ml. of dimethylacetamide. The solution was cast into a film on a glass plate. After drying at 80° C. for 30 minutes, the polyamide-acid film was stripped from the glass plates and converted to polyimide films by steeping in a 3/2 pyridine/acetic anhydride mixture for 24 hours. The film was then immersed in dioxane for two hours, dried at 130° C. for one hour and then heated at 380° C. for one minute.

The properties of the resulting film are given below:

Tensile modulus _____ 520,000 p.s.i.
Elongation _____ 5.5%.
Tensile strength _____ 14,000 p.s.i.
Retention of degree of toughness _____ Greater than 3.

EXAMPLES 23-26

The polyamide-acid solutions were prepared substantially as described for Example 21 using the ingredients shown in Table III.

TABLE III

| Example | Gms. reactants | | Mls. solvent |
|---|---|---|---|
| | Diamine | Dianhydride | |
| 23 | 2.01 PP | 2.37 PMDA | 50 DMF. |
| 24 | 5.17 DDP | 10.1 PDMA | 75 DMF/P(3/2). |
| 25 | 4.22 PP | | |
| 25 | 11.2 PSO$_2$P | 10.0 PMDA | 150 DMF. |
| 26 | 9.8 PSP | 10.0 PMDA | 180 DMF. |

The solutions were cast into films with a doctor knife having a 15-mil opening. After drying for 15 minutes under dry nitrogen in a forced draft oven, the polyamide-acid films were stripped from the glass plates and converted to polyimide films.

In Example 23, the film was steeped in a 2/2/1 benzene/pyridine/acetic anhydride mixture for 20 hours to effect conversion to the polyimide. The film was then dried at 180° C. for two hours and then heated at 500° C. for one minute.

In Examples 24-26, the films were steeped in a 15/1/1 cyclohexane/pyridine/acetic anhydride mixture for 24 hours, then extracted in dioxane for one hour and then dried at 130° C. for one hour.

The properties of the resulting films are given in Table IV.

TABLE IV

| Example | Tensile modulus | Elongation | Tensile strength | Retention of degree of toughness |
|---|---|---|---|---|
| 23 | 850,000 | 14 | 14,900 | [1] 3 |
| 24 | 520,000 | 16.2 | 11,900 | [1] 3 |
| 25 | 360,000 | 15 | 8,300 | [1] 3 |
| 26 | 300,000 | 6.5 | 9,000 | [1] 3 |

[1] Greater than.

EXAMPLE 27

Hexamethylenediamine, 5.8 g., was dissolved in 83 ml. of dimethylacetamide. The solution was cooled (water jacket ca. 15° C.) and 10.9 g. of pyromellitic dianhydride was added portionwise with stirring. Initially a white gummy substance formed which dissolved upon stirring. The resulting polyamide-acid solution contained 16.7% polymer, by weight. Films were cast with a doctor knife having a 10-mil opening and dried at 120-130° C. for 30 minutes.

The film was soaked overnight in a mixture of 180 ml. of benzene, 120 ml. pyridine and 50 ml. of acetic anhydride. The film was dried at 160° C. in vacuum for 2 hours to give strong, tough, flexible film. Its infrared spectra indicated a polyimide film had been obtained.

EXAMPLE 28

4,4'-dimethylheptamethylenediamine, 7.9 g., was dissolved in 81 ml. of dimethylacetamide. Pyromellitic dianhydride, 10.9 g., was added portionwise with stirring and cooling (water jacket ca. 15° C.). Initially a white gummy substance formed which dissolved upon stirring to provide a viscous solution. The solution contained 18.8% by weight of the polyamide-acid. The polymer solution was cast into a film with a doctor knife having a 10-mil opening and the film was dried at 120° C. under draft for 30 minutes.

The film was soaked in a mixture of 180 ml. benzene, 120 ml. pyridine and 50 ml. acetic anhydride overnight. The film was then dried at 160° C. in a vacuum for 2 hours to give a strong, tough flexible polyimide film.

EXAMPLE 29

A 23-mil layer of a 10% solution of the polyamide-acid from pyromellitic dianhydride and 4,4'-diaminodiphenyl ether in dimethylacetamide was cast onto glass plates with a 30-mil doctor knife. These films were then immersed in a tray filled with a mixture of equal volumes of acetic anhydride and pyridine at room temperature. A yellow color began to form in the film layer in less than 30 seconds and this color rapidly became more intense. In less than 3 minutes, the edges of the film began to peel free of the substrate and a tough yellow film could be pulled free at this time. No change in color was observed after five minutes. This gel film, still swollen with liquid, was leached overnight in acetic anhydride/pyridine/benzene (10/10/80). The next day it was clamped to stainless steel frames and heated gradually to 300° C. in a forced draft oven and left at 300° C. for 1 hour. The product was a clear, tough, yellow-orange film.

EXAMPLE 30

A 33-mil layer of a 9.1% solution of polyamide-acid from pyromellitic dianhydride and 4,4'-diaminodiphenyl ether in dimethylacetamide/pyridine (334/506 by weight) was cast onto a glass plate and immersed in a bath of acetic anhydride at room temperature. A yellow color developed in 10 seconds and the edges of the film peeled free in 8 minutes. In 12 minutes, a tough, self-supporting, yellow film peeled loose and was leached and dried as in Example 29 to yield a strong, tough polyimide film.

EXAMPLE 31

A 10% solution of polyamide-acid from pyromellitic dianhydride and 4,4'-diaminodiphenyl ether in dimethylacetamide was doctored onto a belt of 5-mil polyethylene terephthalate film which was then passed into a tank of acetic anhydride/pyridine (50/50) at the rate of 6 inches/minute. A yellow-orange color developed in the film rapidly and the edges began to peel free in 5 minutes. The polyimide gel film was inter-leaved with the polyethylene terephthalate film during windup. When the run was over, the gel film was unwound from the polyethylene terephthalate film and leached in acetic anhydride/pyridine/benzene (10/10/80) overnight. It was then clamped to a stainless steel belt which was passed at a rate of 3-4 inches/minute under 500 watt infra-red heaters with a rapid stream of air. Two passes were necessary for complete drying and conversion. The product was a roll of tough, yellow film.

EXAMPLE 32

Approximately equal volumes of two liquids were pressed into two arms of a T-shaped jet-mixer. The first liquid consisted of a 4% solids solution of polyamide-acid from pyromellitic dianhydride and 4,4'-diaminodiphenyl ether in pyridine/dimethylacetamide (2:1) and the second liquid was acetic anhydride. The intimately mixed liquid emerging from the third arm of the T-mixer was atomized with two lateral jets of air and the resulting mist directed against a glass plate. After about 20 seconds, a thick gel film of essentially polyimide obtained by ring closure of the polyamide-acid was stripped off and washed in benzene and dried under tension. A brilliant, clear, strong film resulted.

EXAMPLE 33

Example 32 was repeated, using kraft paper as the substrate. On drying the coated paper a tough, yellowish coat of polyimide formed, imparting high resistance against fire and water to the paper. Adherence of the coating to the paper was excellent.

EXAMPLE 34

Two solutions, one consisting of a 4% solution of polyamide-acid from pyromellitic dianhydride and 4,4'-diaminodiphenyl ether in dimethylacetamide and the other of a 1:1 mixture (by volume) of acetic anhydride and pyridine, were jet-mixed together in a T-mixer by the procedure of Example 32. The emerging stream was directed against a glass plate and in about ½ minute a thick gel film of polyimide was stripped off. This could be dried to a clear, tough polyimide film which was self-supporting.

EXAMPLE 35

Sixty mls. of 16.5% polyamide-acid from pyromellitic dianhydride and 4,4'-diaminodiphenyl ether in DMAC/NMP (0.024 m. polyamide) was mixed with 5.0 mls. acetic anhydride (0.05 mole) and 2.0 ml. pyridine (0.025 mole) and cast onto a glass plate. No gelation occurred at room temperature until 11 minutes after mixing. After an additional 5 minutes, the gel film freed itself from the plate by exuding liquid. The gel film was impaled on a "pin-frame" and dried to a final temperature of 300°. An identical freshly-cast gel film on a glass plate was placed in an air oven at 90° C. immediately after casting. Gelation occurred in less than 2 minutes even though the plate temperature reached only 50° C. In both cases, strong tough polyimide films were obtained after drying.

EXAMPLE 36

Two quarts of 16.5% solution in DMAC/NMP of the polyamide-acid from pyromellitic dianhydride and 4,4'-diaminodiphenyl ether was mixed for 5 minutes in a Hobart mixer with 220 mls. of acetic anhydride and 60 mls. pyridine. The mixture was fed to a 1" extruder fitted with a 6" die with a 25-mil lip opening. A steam heated drum was positioned 0.25" below the die. Extrusion was accomplished without heating of barrel or die. At a drum temperature of 100° C. gelation occurred in 15 seconds and a tough gel film could be stripped after 30 seconds. Samples of the gel film were dried to 250° C. to yield strong tough polyimide obtained by ring closure of polyamide-acid from pyromellitic dianhydride and 4,4'-diaminodiphenyl ether film.

EXAMPLE 37

A golden shiny coating was achieved on "Reynolds Wrap" aluminum foil by the jet-conversion technique. In a T-mixer, equal volumes of a solution (a) consisting of about 5% polyamide-acid from pyromellitic dianhydride and 4,4'-diaminodiphenyl ether in benzene/dimethylacetamide (3:2) and a solution (b) consisting of acetic anhydride/pyridine (1:1 by volume) were mixed and the emerging stream was sprayed onto aluminum foil. After air-drying for several days the coated foil was heated 15 minutes at 180°, 5 minutes at 300°, and 10 minutes at 400°. The coating adhered tenaciously to the foil and imparted greatly improved toughness to it. Such a composition is useful in a capacitor.

EXAMPLE 38

A solution in DMAC of the polyamide-acid of 4,4'-diaminodiphenyl ether and pyromellitic dianhydride was cast into a film of about 0.15 mil in thickness. This was immersed in a 1 M solution of acetic anhydride in benzene for 20 hours at room temperature to form a polyimide film.

EXAMPLE 39

To a 0.01 mole sample of the polyamide-acid made from 4,4'-diaminodiphenyl ether and pyromellitic dianhydride (as a 15% by weight solution in DMAC) was added at room temperature 0.03 mole of acetic anhydride and 0.005 mole of isoquinoline. After thorough mixing, the reaction mixture was doctored with a 30 mil knife onto a glass plate at 30° C. This gel film was maintained at 30° C. for 30 minutes. A strong, highly swollen gel film of polyimide resulted. After drying for one hour at 300° C. under restraint on a frame, the film was stiff, tough and strong.

EXAMPLES 40-45

The procedure of Example 39 was repeated using 0.03 mole of acetic anhydride with different tertiary amine catalysts. Strong, tough polyimide films were produced in each case. The tertiary amine and the amount used are given in the table below:

| Example | Amine | Moles |
|---|---|---|
| 40 | 3,5-lutidine | 0.005 |
| 41 | 3,4-lutidine | 0.005 |
| 42 | Trimethylamine | 0.0005 |
| 43 | Triethylenediamine | 0.0005 |
| 44 | N-dimethylcyclohexylamine | 0.02 |
| 45 | N-methyl morpholine | 0.01 |

EXAMPLES 46-48

The procedure of Examples 39-45 was repeated except that the reaction mixture was doctored and maintained at 100° C. for 0.5 minute instead of at 30° C. for 30 minutes to produce, after drying, tough polyimide films. The following tertiary amines were used with the acetic anhydride:

| Example | Amine | Moles |
|---|---|---|
| 46 | 3-methyl pyridine | 0.005 |
| 47 | 4-methyl pyridine | 0.005 |
| 48 | N-dimethyl dodecylamine | 0.01 |

EXAMPLES 49-52

The procedure of Example 39 was repeated using 0.03 mole of the anhydrides given in the table below and maintaining the polyimide gel film at 30° C. for the periods shown in the table. In each case, a tough polyimide film resulted.

| Example | Anhydride | Periods (minutes) |
|---|---|---|
| 49 | n-Butyric | 60 |
| 50 | iso-Butyric | 60 |
| 51 | Acetic benzoic | 30 |
| 52 [1] | Propionic | 30 |

[1] 0.005 mole of pyridine instead of isoquinoline was used.

EXAMPLE 53

When a thin layer of the polyamide-acid solution of Example 39 was exposed to a stream of gaseous ketene, the solution gelled quickly into a tough polyimide film which could be dried quickly at 300° C. without blistering.

EXAMPLE 54

An excess of liquid ketene was mixed into a sample of the polymer solution of Example 39 at −20° C. The resulting mixture was stable. Upon raising the temperature to room temperature the polymer gelled rapidly and converted to polyimide.

EXAMPLE 55

The same amount of the polyamide-acid described in Example 39 was mixed with 0.04 mole of acetic formic anhydride, a mixed anhydride, at 30° C. After a few minutes the mixture started to foam and eventually reached a volume more than twice the original. After 30 minutes, the foam had set to a strong polyimide gel, which was then dried for an hour at 300° C. to give a very stiff, strong polyimide foam.

It is apparent from some of the foregoing examples (Examples 4, 13, 16–18, 21–23, 35, 37, 39–53 and 55), that improvements in properties of the polyimide products may be obtained by adding a third step to the process. The third step comprises heating the polyimide to a temperature of 300°–500° C. for a short interval (15 seconds to 20 minutes).

The polyimides prepared by the process of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties at room temperature, but retain their strength and excellent response to work-loading at elevated temperatures for prolonged periods of time. Behavior of this type offers commercial utility in a wide range of end uses. The polyimide polymers display excellent resistance to corrosive atmospheres. The polymer resists melting upon exposure at 500° C. for extended periods while retaining hitherto unrealized high-proportions of room temperature physical properties. Because of the unusual and surprising solubility of the polymer precursor (the polyamide-acid) in the process of preparation, this polymer precursor may be processed into shaped articles such as films and fibers by conventional techniques and then converted in situ to the polyimide polymer.

Films of the polyimide may be used wherever films have heretofore been used. They serve advantageously in an extensive variety of wrapping, packaging and bundling applications. Additionally, the polymer in various forms may be used in automobile and aviation interior head lining materials, decorative trim, high temperature electrical insulation such as for slot liners, use in dry transformers, capacitors, coil and cable wrappings, etc., for packaging items to be exposed to high temperature while within the package, corrosion-resistant pipe, pipe-lagging and duct work, containers and container linings, and laminating structures where the films are bonded to the sheet metal or foils.

The film can also serve as a printed circuit backing. Electric circuits can be made by coating the polyimide film with a thin layer of copper or aluminum, either by coating the metal with polyamide-acid and converting to polyimide, or by laminating to a polyimide film, or by vacuum metallization of the film. The circuit design is covered by a protective coating and the extra metal is etched off followed by washing to halt the etching. An outstanding advantage of such circuits is that the base film is so stable to heat that they can be connected to other components by a dip soldering technique while in contact with the other components.

The film also can serve as the outer, insulating layers of flat wire and cable assemblies, in which flat wires or metal strips are laminated between layers of polyimide film. Because of the excellent thermal stability of this polymer, such assemblies can be made by depositing strips of molten copper on a polyimide film, followed by the application of another layer of polyimide on the face carrying these strips. The laminated structure can then be slit longitudinally to produce strips of flat wire, each of which is insulated by being imbedded between two polyimide layers, except at the terminations. Such assemblies can be in multilayers, i.e., alternating layers of film and metal. Alternatively, the wire can be coated as described in the examples to have a polyimide coating. The coated wire can then be coated with a second type of polymeric coating, such as silicones, polyamides, polyesters, tetrafluoroethylene and its copolymers with hexafluoropropylene, polyvinyl acetals, e.g. polyvinyl butyral and epoxy resins.

In fiber form, the polymer of the present invention offers possibilities for high temperature electrical insulation, protective clothing and curtains, filtration media, packing and bearing materials, brake linings and clutch facings.

In summary, the polymer has potentiality in a wide variety of applications. Some other possibilities include: as a finish for oven interiors, dryer liner, cooking utensil finish, muffler finish, liner for high temperature plant equipment, liner for hot water heaters, shatter-proof coating for glass in very thin films where high heat is involved (high wattage lamps, Pyrex baking dishes, etc.), as a low friction and high temperature lubricating film, as a flame-retardant paint, in heating elements made by incorporating either metallic conducting strips or conductive coatings of the "Chemelux" type, in belting for use in high temperature conveyors, as a liner for packaging of molten materials and as an underlay for flammable roofing.

What is claimed is:

1. In a process for preparing polyimides wherein at least one diamine having the structural formula:

$$H_2N-R'-NH_2$$

R' being a divalent organic radical containing at least five carbon atoms and the two amino groups of said diamine each being attached to separate carbon atoms of said divalent radical, is reacted with at least one aromatic tetracarboxylic acid dianhydride, all four carbonyl groups of said dianhydride being directly attached to an aromatic ring of said dianhydride, in an organic solvent for at least one reactant for a time sufficient and at a temperature below 175° C. sufficient to form a polyamide-acid intermediate soluble in said solvent and said polyamide-acid intermediate is converted to an insoluble solid polyimide, the improvement wherein said polyamide-acid intermediate is treated with a lower fatty monocarboxylic acid anhydride to form said insoluble solid polyimide.

2. An improvement as in claim 1 wherein said polyamide-acid intermediate is formed into a shaped structure before being treated with said lower fatty monocarboxylic acid anhydride.

3. An improvement as in claim 1 wherein said polyamide-acid intermediate is formed into a self-supporting film before being treated with said lower fatty monocarboxylic acid anhydride.

4. An improvement as in claim 1 wherein said polyamide-acid intermediate is formed into a filament before being treated with said lower fatty monocarboxylic acid anhydride.

5. An improvement as in claim 1 wherein said diamine is selected from the group consisting of meta-phenylenediamine, para-phenylenediamine, benzidine, 4,4'-diamino-diphenyl propane, 4,4'-diamino-diphenyl methane, 4,4'-diamino - diphenyl ether, 4,4'-diamino - diphenyl sulfone, 4,4'-diamino-diphenyl sulfide, hexamethylenediamine and 4,4'-dimethylheptamethylenediamine.

6. An improvement as in claim 1 wherein said diamine is an aromatic diamine.

7. An improvement as in claim 1 wherein said diamine is 4,4'-diamino-diphenyl ether and said dianhydride is pyromellitic dianhydride.

8. An improvement as in claim 1 wherein said dianhydride is selected from the group consisting of pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride.

9. A process for preparing polyimides which comprises treating a polyamide-acid having the recurring unit of the formula

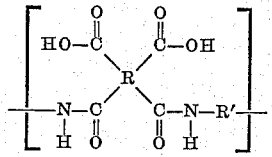

wherein

R' is a divalent organic radical containing at least five carbon atoms, and

R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical, said polyamide-acid being soluble in a solvent, with a lower fatty monocarboxylic acid anhydride to form a solid polyimide having the recurring unit of the formula

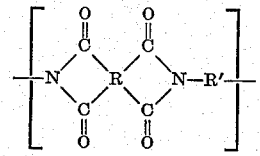

said polyimide being insoluble in said solvent.

10. A process as in claim 9 wherein said solvent is selected from the group consisting of N,N-dimethylformamide; N,N-dimethylacetamide; N,N-diethylformamide; N,N-diethylacetamide; N,N-dimethylmethoxy acetamide; pyridine and N-methyl caprolactam.

11. A process as in claim 9 wherein said lower fatty monocarboxylic acid anhydride is acetic anhydride.

12. A process as in claim 9 wherein said polyamide-acid is treated with a lower fatty monocarboxylic acid anhydride and a tertiary amine.

13. A process as in claim 9 wherein said polyamide-acid is treated with acetic anhydride and pyridine.

14. A process as in claim 9 wherein said polyimide is heated to a temperature of 300° C.–500° C. for at least 15 seconds.

References Cited by the Examiner

UNITED STATES PATENTS

| | | | |
|---|---|---|---|
| 2,071,250 | 2/37 | Carothers | 260—78 |
| 2,710,853 | 6/55 | Edwards et al. | 260—78 |
| 2,712,543 | 7/55 | Gresham et al. | 260—78 |
| 2,731,447 | 1/56 | Gresham et al. | 260—78 |
| 2,880,230 | 3/59 | Edwards et al. | 260—78 |
| 2,900,369 | 8/59 | Edwards et al. | 260—78 |
| 3,037,966 | 6/62 | Chow et al. | 260—78 |
| 3,049,518 | 8/62 | Stephens | 260—78 |
| 3,073,784 | 1/63 | Endrey | 260—78 |
| 3,073,785 | 1/63 | Angelo | 260—78 |

WILLIAM H. SHORT, *Primary Examiner.*

LOUISE P. QUAST, *Examiner.*